No. 867,180. PATENTED SEPT. 24, 1907.
G. T. WOODS.
VEHICLE CONTROLLING APPARATUS.
APPLICATION FILED SEPT. 23, 1899.

WITNESSES: INVENTOR

No. 867,180. PATENTED SEPT. 24, 1907.
G. T. WOODS.
VEHICLE CONTROLLING APPARATUS.
APPLICATION FILED SEPT. 23, 1899.

WITNESSES:
Frank S. Ober
M. J. Ludlow

INVENTOR
G. T. Woods
BY
ATTORNEY

No. 867,180. PATENTED SEPT. 24, 1907.
G. T. WOODS.
VEHICLE CONTROLLING APPARATUS.
APPLICATION FILED SEPT. 23, 1899.

WITNESSES:
L. Blair
L. Woods

INVENTOR
G. T. Woods

UNITED STATES PATENT OFFICE.

GRANVILLE T. WOODS, OF NEW YORK, N. Y.

VEHICLE-CONTROLLING APPARATUS.

No. 867,180.    Specification of Letters Patent.    Patented Sept. 24, 1907.

Application filed September 23, 1899. Serial No. 731,411.

*To all whom it may concern:*

Be it known that I, GRANVILLE T. WOODS, a citizen of the United States, and a resident of New York, in the county of New York and State of New York, have invented certain new and useful Vehicle-Controlling Apparatus, of which the following is a specification.

The object of this invention is to provide a novel, useful and interesting vehicle controlling apparatus, capable of use in connection with motor-driven cars or vehicles used for railroads, or railways, or any other purpose, or in any situation.

The invention comprises, in part, a plurality of tracks or ways, which may be in suitable proximity to permit the movement of the cars or objects on all to be readily observed at once, or from one another, and a motor vehicle, car or other device for each track moving preferably along suitable guides or ways.

The apparatus may be constructed on a large or a small scale, as desired, and the moving cars, devices or vehicles may be capable of carrying persons or objects, or not, as desired, and according to the kind and extent of space to be occupied.

The motor may be of any kind, but preferably is an electric motor (employing any suitable kind of field and armature winding, and any suitable kinds of current), which may be operatively connected to the car or vehicle in any suitable way, and carried by or upon the car, or located at the side of the track, as hereinafter set forth.

The tracks may be sinuous or undulating, or both, and means may be provided for returning each car to the starting point. Preferably this is done by making each track or way of a shape which returns upon itself.

The controlling devices may be of any desired form adapted to the character of the energy and motor to be utilized, and each is initially controlled by hand, being adjusted while the apparatus is in motion. Preferably the apparatus is so constructed that the condition of the controlling device may be judged by the position or condition of certain of the parts, the effects also being observable or judged of by the observed speed or changes of speed, or condition of the car, or other energy utilizing object.

In the accompanying drawings.

Figures 1, 5, 10, 11, 12:
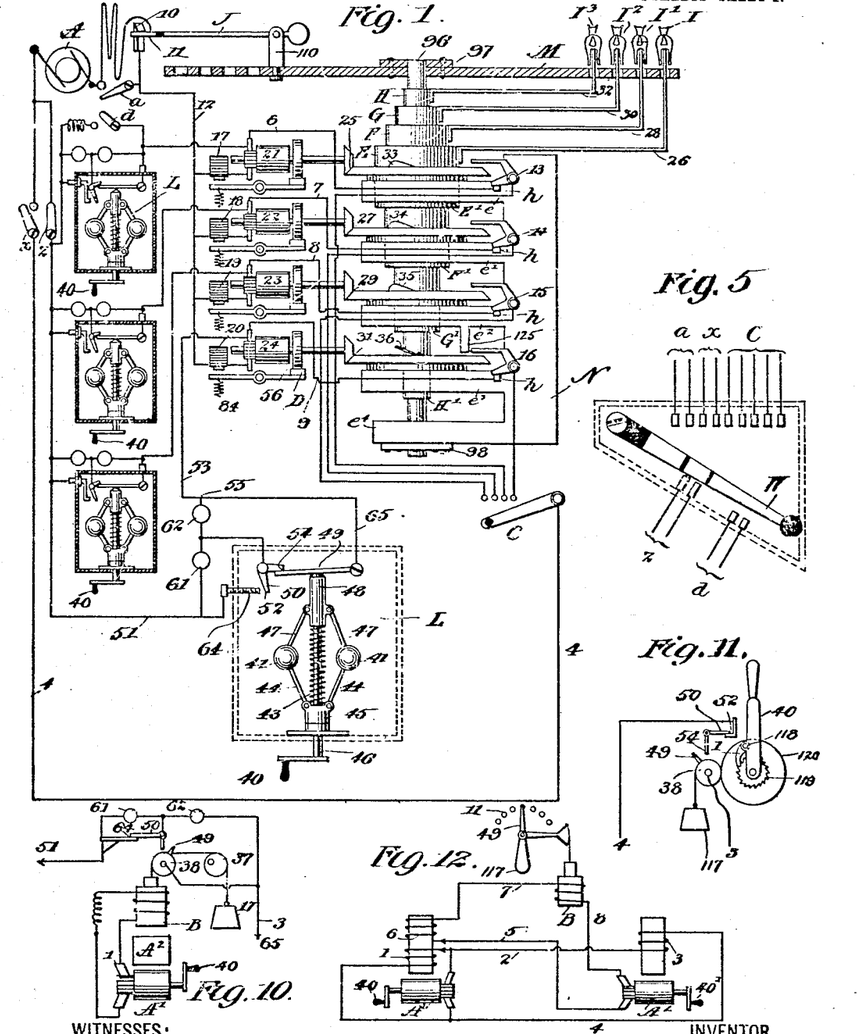
Figure 1 is a general diagrammatic view illustrating one way of carrying out my invention by means of an electrically propelled apparatus moving along ways. The various mechanisms are shown in side elevation.
Fig. 5 shows a master-switch mechanism which is intended to perform the duties of the several switches shown in Fig. 1.
Fig. 10 illustrates a modification in the means for operating the controller at a distance.
Fig. 11 shows a further modification of the same.
Fig. 12 shows a modification of the duplex controller.

In Fig. 1—I, $I'$, $I^2$, $I^3$ are the devices or objects which are to be driven around or over suitable guides or paths, by means of a motive power controllable by hand, as hereinafter described. In the present instance they are shown as moving in circular paths above the surface of a table or platform M, which, in the form of my invention illustrated in Fig. 1, has circular slots for the passage of arms or standards supporting said devices; and in Fig. 4. is shown as provided with railway or railroad tracks on which the devices travel as wheeled vehicles. The cars, vehicles or devices may be driven by any suitable motive power in any desired way; one of the ways is shown in Fig. 1, wherein the said devices are shown as supported on arms 26, 28, 30, 32, connected to corresponding rotary and concentric posts, rings, or shafts H, G, F, and E. The posts or shafts are hollow and arranged within one another, that is to say, post E, surrounds post F; and F, in turn, incloses G; and G, surrounds H.

Passing through post H is the guide post or standard 96, which has its upper end secured to table or platform M, by means of plate 97, while its lower end is made fast to frame N, by means of plate 98. Frame N has five lateral projections, $e$, $e'$, $e^2$, $e^3$, $e^4$, through each of which one or more of said posts project; that is to say, post E, extends through the projection $e$ to the level of point $E'$; post F, extends through post E, projection $e$, and projection $e'$, to the level of point $F'$; post G, extends through posts E, and F, projections $e$, $e'$, and $e^2$ to the level of point $G'$: post H extends through the preceding posts E, F, G, and projections $e$, $e'$, $e^2$, $e^3$ to the level of point $H'$.

Each of the hollow posts has its individually driven bevel gear wheel secured to and surrounding it, and each of said wheels rests on one of the aforesaid lateral projections from frame N, and rotates horizontally thereon.

Each of the devices I, $I^1$, $I^2$, $I^3$ is driven preferably by an electric motor, though other forms of motor might be employed. An electric motor is preferred, as it is readily controllable as to speed, and lends itself to use with the other devices herein described. Four electric motors of usual form are typified at 24, 23, 22, 21, one such motor being provided for each device. A, is any generator of electric energy supplying the power to run said motors over a circuit 12, the return of which is by wire 4, or 5, according to the position of the switch devices which determine whether the circuit shall be through the "starting line" position circuit controllers or through the speed controllers as will be presently described. The motors may be fed in multiple from said supply wire 12, or may be supplied in any other desired way. In every instance the motors may be operatively connected to the vehicles or cars by any desired means, as for instance, by the smaller gear wheels being secured to the motor shafts and driving the larger gear wheels, which in turn are operatively connected to the vehicles or cars in any suitable manner.

Combined with the motor for each motor driven device are suitable means for automatically indicating the starting line by automatically throwing the motor out of action when the said device has been moved up to the starting line or position, and also for automatically indicating the finish line by automatically throwing said motors out of action at the instant when in a contest the leading device reaches a temporary stop position or "finish line." In the case of electric motors this is conveniently accomplished by means of circuit breakers governing an operative circuit of the motor, in any desired manner. Combined also with each moving device is a restraining brake or stop mechanism designed to automatically stop said moving devices when they have been moved into proper alinement at the starting point, and also to stop them automatically in the position they may occupy at the instant when, in a contest, the leading device reaches the finish line. Said stop device is, in the present instance, by preference electrically controlled in its operation, and is connected to any desired portion of the mechanism. By preference it consists of a brake or stop wheel on the shaft of the driving motor, and a brake or stop acting on said wheel, and in control of an electro-magnet.

Referring to the lower motor 24, D, is a brake shoe, or detent acting on a brake or detent wheel 56, upon the shaft of the motor, and 20, is an electro magnet whose armature lever carries the shoe or detent D. A suitable device removes the brake, and a spring or other suitable medium acting in any suitable manner, applies the brake or stop, and stops the driving mechanism and connected moving device I³. Magnet 20, and its armature lever represent any suitable kind of electro-mechanical apparatus which takes energy from the common source of electrical supply (A) to change the normal condition of spring 84 (or any other suitable elastic medium) to a condition which is suitable for forcing the brake to "set" or press against the wheel to stop the car, vehicle or device. The other moving devices I², I¹, I, are similarly equipped. The action of the magnets in bringing the devices to rest at the starting line is governed by suitable circuit controllers, or circuit breakers which are termed herein "position" circuit breakers or tripping devices, and are connected with or applied to some portion of the mechanism or devices that travel with each moving device I, I′, I², I³, at such points that when the said device reaches "position" or the starting line, the said circuit breaker or closer will come into action and by its operation upon the circuit of the magnet cause the stop mechanism to act, and thus bring the moving device to rest. The said circuit controller may obviously work on open or closed circuit, i. e., may cause the stop to be applied by closing or by opening the circuit when the mechanism has moved to the desired point, but is herein shown as operating on closed circuit. It may be of any desired construction and applied to any desired portion of the apparatus, but is here shown as applied to the large wheels of the bevel driving gears. The same circuit controller or breaker, or one similarly applied may act to "kill" the electric motor at the instant the stop is applied, by breaking or shunting the current supply, as well understood in the art.

A preferred construction is as follows:—Upon each of the larger gear wheels a lug is secured as shown at 33, 34, 35 and 36. These lugs are arranged so as to pass under the arms of circuit breakers 13, 14, 15 and 16, respectively, which are mounted on frame N, or other suitable supports. The short arms of said circuit breakers as shown rest at their outer ends upon fixed contacts h, h, &c., the said contacts being terminals of wires and parts of circuits leading from the driving motors 21, 22, 23, 24, which drive the shafts E, F, G, H, respectively, and operating on the circuit of each of said motors in such manner as to electrically "kill" the motor, and thereby bring it to rest as well as to act on the circuit of one of the stop or detent controlling magnets in a manner to mechanically brake or stop the motor, and connected mechanism. For this purpose the said circuit breaker may be placed in a series circuit with the brake or stop magnet and the electric motor, as shown, but any other arrangement or connection of circuits and devices accomplishing the same result may be employed. The circuit breakers are suitably insulated from the frame N. The lower lug 36 is shown as consisting of a spring which passes under a fixed shoulder or lug 125, which forms an obstruction in the path of the free end of spring 36, and which serves to depress the end of the spring and put it under tension before it reaches the long arm of the circuit breaker 16. When the free end of the spring passes by the obstruction its end snaps up, and striking under the long arm of the circuit breaker, opens the circuit with a quick or snap action which serves to prevent any arc from forming at the contact of the circuit breaker. This device also serves to permit the opening of the circuit to be timed more exactly to correspondence with the position of the moving device at the starting line; inasmuch as the complete operation takes place at the instant the free end of the spring escapes the shoulder 125.

Figure 2:
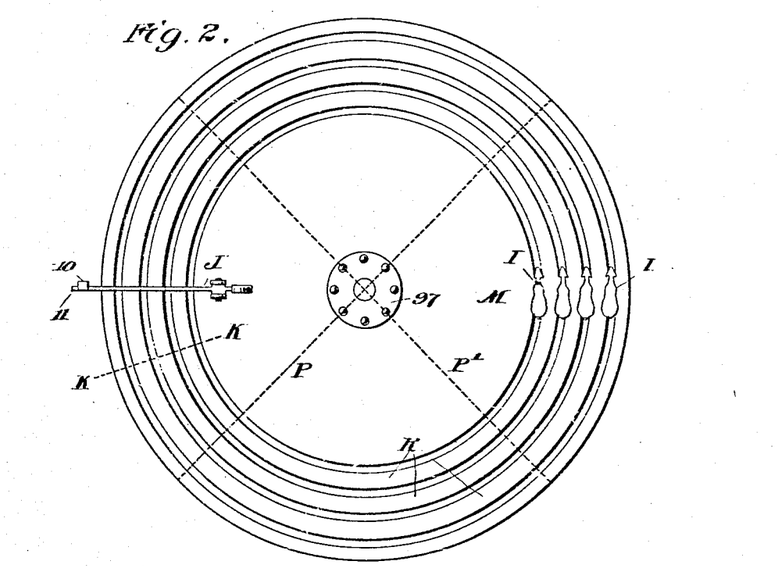
Fig. 2 is a plan view of the series of circular ways and the devices propelled on or over the same.
Figure 3:
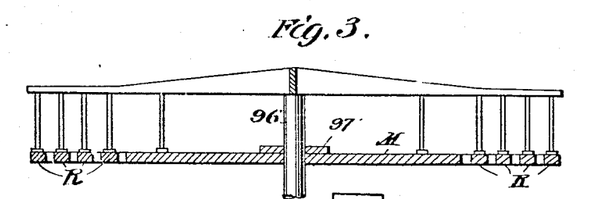
Fig. 3 illustrates in side elevation and partial section a form of bridge work for supporting the guides or ways on which the devices move.

For bringing all of the devices to rest when the first in a contest reaches the finish line, a controlling device located at the finish line or position corresponding to the finish line, and adapted to be operated by the leading device or a part moving with the same is employed. Said controlling device controls by any suitable means the motion of all the devices in suitable manner to bring them all to rest (temporarily) at approximately the same instant. For this purpose it may cut off the motive power, or throw off the operating mechanism of all the devices, and may at the same time apply a positive mechanical lock or stop to each, or to some portion of its associated mechanism, either or both as desired. Preferably it is made to both cut off the motive power and apply the lock or stop. In the case of electrically propelled devices, the said controlling device is a circuit breaker or controller acting on an operative circuit of the motor in a manner to kill the same. The same controller may also govern the application of the brake devices by controlling the action of electro magnets, and said stop devices and electro magnets may be those which also operate under the control of the starting line circuit breaker, in which case electric switches are provided for changing the connections from one controller to the other under the changed conditions of use. The controlling device is herein shown as a circuit breaking lever or tripping device J, which is arranged along the path of the moving devices or vehicles, although it may be constructed and arranged in any suitable way. The said tripping device J, is by preference a biased lever pivotally mounted on a post 110, as shown, and biased by a weight or other device, which tends to throw it up out of the way of the moving devices, and in a manner to quickly open a circuit formed through catch 10, and the insulated contact 11, on the end of said lever, when it is drawn down and detained by said catch. Said circuit is the supply circuit for the several driving motors, and it may also govern the action of the stop magnets when the latter are in circuit with the motors, as shown, although a separate circuit might be used for this purpose. To permit the lever to become disengaged from the catch 10, when it is struck by the leading device, the post 110, on which it is pivoted is adapted to turn on its vertical axis, so that the lever may swing horizontally from under the shoulder of the catch, thus breaking the circuit, whereupon the weight or spring raises it out of the path of the moving devices. The latter may be then brought without hindrance to the starting line or position which is slightly in advance of the finish line, and is indicated by the dotted line K, K, Fig. 2.

At a, is shown a suitable switch adapted to close the circuit around the "finish line" circuit breaker or controller contacts 10, 11. When the lever J, is down, and contacts 10, 11, closed, the switch a, is opened, and the supply circuit 12, from generator A, to the motors is through the contacts 10, 11. When the contacts are open, the switch a, is closed, so that the circuit 12, may be complete for the purpose of running the motors to bring all the devices around to the starting line.

C, is a switch that closes the connection between the several position circuit controllers 13, 14, 15, 16, and the return wire 4; and z, is a switch that closes the return from the several speed controllers apparatus L, one for each motor, to the generator A. The function of switch x, placed in the return 4, will be described in connection with the description of the operation. A switch d, serves to complete a shunt around the controller for one of the moving devices whereby said motor may be run at a continuous speed, and used as a "pace maker" for the other devices, as will be described further on. This shunt connection preferably contains an artificial resistance, as shown. Said resistance may be variable, if desired.

One form of motor speed controlling contacts and manually operable master controller therefor, are indicated at L. In these devices the control of the motor speed may be either a momentary completion of a circuit, which causes a higher speed the more often it is produced, or the longer it is maintained, or I may combine with the motor speed or circuit controller a variable resistance or any other suitable electrical condition changer, to vary the speed of the motor. The action of this controller is, in some constructions, made to depend upon the maintenance of a critical operation of the master-controller handle, which is turned or moved by hand. In such cases, if the manual actuation or control of said handle changes, the speed of the motor will change. In one form of this part of my invention, the turning of the handle of the master-controller generates a centrifugal force that tends to move some of the parts in opposition to another force, such as a spring. The maintenance of a critical force by the manual operation of said handle maintains parts of the motor-circuit controller in a certain position, a change from which produces a change in the electrical conditions of the motor, and effects a change in the speed thereof. In another form of the invention the turning of the master-controller handle at a certain speed generates electric power in sufficient amount to maintain a position of the motor-circuit controller parts where the motor will move at its highest speed. Or said handle may act in any other way when turned or operated to produce a power, force or influence, or to bring such into action to a degree sufficient to maintain the working parts of the contactor device or motor circuit controller in an operative position, as will be described further on. In fact any intermediate device or devices may be used which will be responsive to changes in the operation of the master-controller handle, and will through suitable connection with a distant speed-controlling-device for the motor maintain parts of the same in different positions or conditions dependent upon the operation of the handle of the master-controller.

I may use for the motor circuit controller contacts or contactors a compound contact, comprising two movable contacts moving in connection with one another, and a fixed contact in such manner that the circuit is completed at both points only when all the parts are in a certain position, and engaged, while any variation of position of the contacts operated by the master-controller in either direction may rupture the circuit at one or another point of engagement.

Referring now to the enlarged controller apparatus at L (Fig. 1), 49 is a "motor-circuit contactor" which electrically connects conductor 65 to, and disconnects it from another motor-circuit contactor 50, the position and the electrical condition of which depends upon the manual operation of the handle 40, which in turn operates shaft 46. In this form of my invention the intermediate device between handle 40 and contactor 49, and which is responsive to changes in the operation of the handle, is like the ball governor device of a steam engine and comprises the usual pair of ball 41, connected by links 47 and 44 with a fixed head or sleeve 45, fixed to the shaft 46, and a movable head or cap 48, adapted to slide or move longitudinally upon the shaft 46, but restrained from rotation thereon. Under the rotation of the shaft the balls 41, by centrifugal action, are thrown outwardly to a degree dependent upon the speed of rotation and draw the head 48 downward against the opposing of a spring 43, thereby permitting the contactor 49 to move downwardly. Any decrease in speed will cause a reverse movement of the contactor 49, by reason of the decreased centrifugal force in the balls 41, and as will be obvious, the maintenance of the contactor 49 in any position can only be secured by rotation of the handle and shaft at a predetermined or critical speed. A variation from that speed will cause corresponding movements of the contactor 49, which will assume and maintain a position governed entirely by the speed at which the shaft 46, is rotated. The contactor 49, may operate in any desired way to affect the speed of the motor. It might serve to simply close the circuit of the motor through a contact, said circuit being closed only at a critical speed of the handle, in which condition the motor would run at its best speed, while any decrease or increase of action of the motor handle would cause the circuit to be opened, slowing the speed of the motor. A double or compound contact device or contactor, such as shown in Fig 1, wherein the contactor 49, operates on two circuits or branches of circuits, in such manner as to close both when it is in a given or intermediate position, and to break one circuit or branch while maintaining the other, if moved in one direction from such intermediate position, and vice versa, if moved in the opposite direction. The contactor 49, may itself constitute a path for the current, or may have contacts insulated from the lever but properly connected to the circuit.

At 54, is indicated a contact or contactor 50, upon which contactor 49, operates, and with which it serves to make an electrical connection. Contactor 50, is also adapted to make connection with the contact stop 64. By this means there are provided, as will be seen, two points of contact by which circuits or branches of circuits may be closed, namely, one at 52, between contactor 50, and contact 64, and the other at 54, between contactors 49, and 50. When the contactor 49, is depressed sufficiently to establish the connection at 52, at that instant, and before it leaves the contactor 50, both circuits or branches of circuits will be closed at the two points of contact. A movement of the contactor 49, from this intermediate position in either direction will break one or the other of the two branches or circuits established over the two points of contact. If the lever drops further, the contact at 52, will be maintained, but that at 54 will be broken. If the contactor 49, moves in the opposite direction from the aforesaid intermediate position, then the contact at 52, will be broken, but that at 54, will be maintained.

It is obvious that a certain critical speed of rotation of shaft 46, by means of handle 40, must be maintained, in order to keep both the circuits or branches of circuits closed, and that any variation of such critical speed, above or below, will break one or the other of the two contacts. This contactor device may be used in various ways to operate upon the circuit of the motor. One way of using the same is as follows: Assuming that the device such as the motor whose speed or action is to be controlled is in a circuit 53, 51, in which the controller is interposed. At 62, 61, are indicated two signal lamps, which may serve as the artificial resistance or signal which is shunted from or left in the circuit 53, 51, according to the position of contactor 49, which is itself connected by wire 65 to one side of said pair of signal lamps, and contact 64 is connected to the other side. Contactor 50 is connected between the lamps 62, 61. When both contacts are made, the circuit is established around the lamps or resistance by wire 65, contactor 49, contactor 50, contact 52, and contact 64. If the speed of the handle 40 falls, the portion of the shunt circuit around lamp 61 will be opened at contact 52, and said lamp will be interposed as a resistance or indicator in the circuit between 53 and 51. If the speed rises above the speed necessary to shunt the resistances out of the circuit, the portion of the shunt around lamp 62 will be broken, so that the resistance of said lamp 62 will be interposed in the circuit. Said resistances 62, 61 may be the same or different in amount. Each time that the operation of the handle 40 falls below the critical, the lamp 61 will glow, and each time that it rises above the critical speed, the lamp 62 will glow.

The operative parts of the contactor devices being inclosed in a suitable case indicated by the dotted line, it is obvious that their position may not be seen by the operator of the handle, who is obliged to determine the best speed of rotation to produce the best speed of the motor device by observing the speed or changes of speed in the same in response to variations in the speed imparted to the shaft 46. The lamps or other signals 62, 61 will furnish an additional indication of the position or condition of the inclosed parts, and will be an aid to the operator in enabling him to produce and maintain the desired speed. But even with such indication, nice judgment and skill will (in some adjustments) be required in rotating the shaft 46 at a constant critical speed. It is possible, however, to dispense with signals such as described, and to leave the operator to exercise his judgment and skill solely by observing the speed and changes in speed in that one of the moving devices I, I', I², I³, which is under his control.

Figures 4, 7, 8, 9, 13:
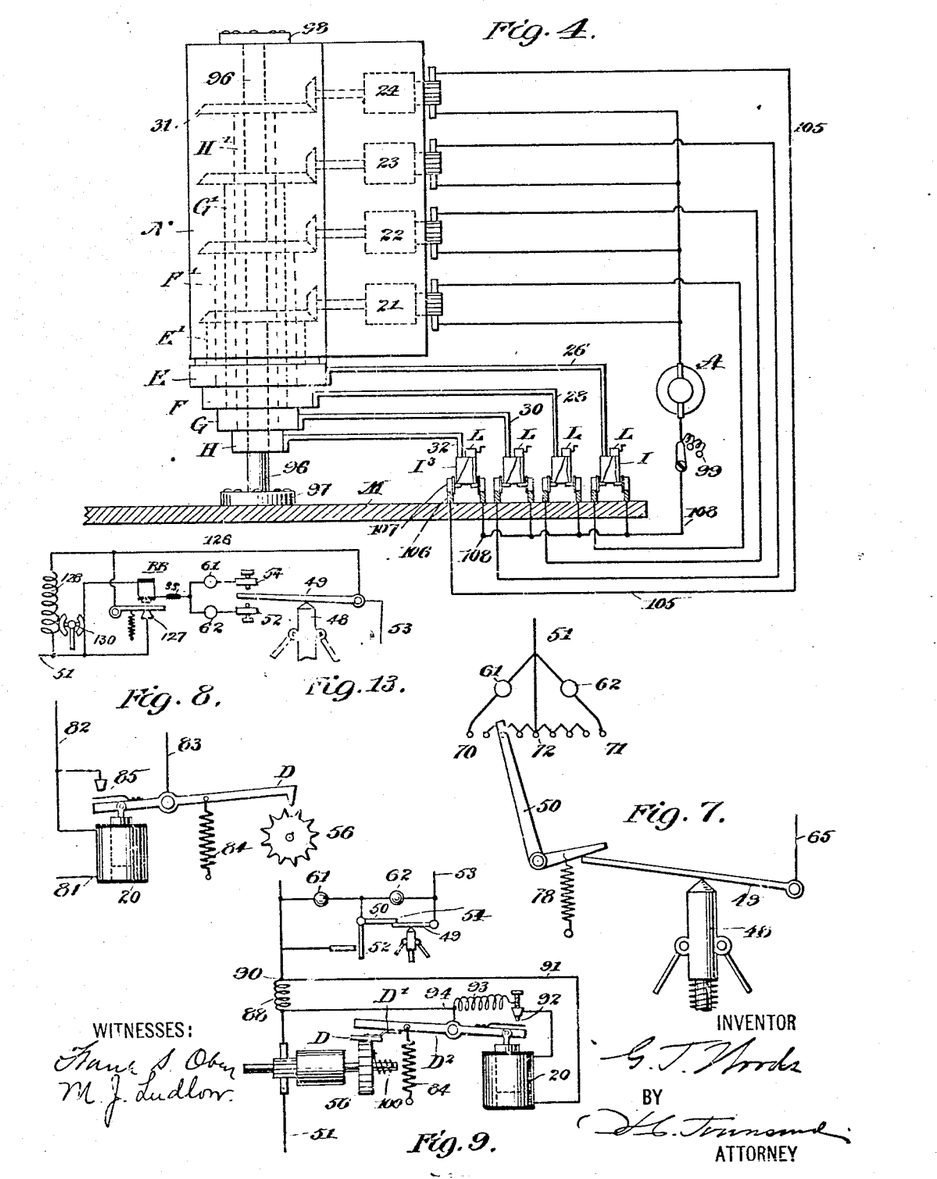
Fig. 4 is a diagrammatic illustration of an arrangement whereby all of the driving or propelling mechanisms may be located above the guides or ways.
Fig. 7 is a detail view of a further modification of the electric power or speed controller.
Fig. 8 is a detail view of an improved form of brake adapted to be used in connection with the apparatus.
Fig. 9 shows another form of brake.
Fig. 13 illustrates a detail of the electric controller.

In Fig. 13 is shown a preferred arrangement of the contactor or motor circuit controlling devices operated by the contactor 49, and designed to secure a quick break of circuit in the operation of controlling the motor speed or the action of the brake devices. In this modification, the contactor 49 operates between two contacts, 54, 52 (preferably made adjustable). When the contactor makes circuit with either 54 or 52 it completes the connection through a distant magnet B B, as shown, and by 53, contactor 49, contact 52, or 54 lamp 61 or 62, magnet B B, and to a flexible conductor forming the continuation of the circuit. When the magnet is energized its armature lever is suddenly drawn up, thus breaking the circuit at contact 127, which completes the normal low resistance or flexible shunt connection from 53 to 51, so long as the contactor 49 moves in the intermediate position, and the magnet B B is not excited. The lamps 61, 62 serve, as in the arrangement indicated in Fig. 1, to signal when the speed of the master-controller rises above or falls below the critical speed necessary to keep the circuit closed at 127. At 128 is indicated an artificial resistance in a branch around the shunt circuit closer 127, which resistance serves to take up and minimize sparking at the contact 127. The magnet B B is made with a considerable resistance, so that by reason thereof, and because of the resistance of lamps 61, 62, but little current will flow over contacts 54, 52, and little sparking will be produced at such contacts when the circuit from 49 is opened.

It is obvious that the circuit from 53 to 51 might be connected as a shunt circuit around a portion of the motor, and that the circuit through contact 127, might be omitted, and magnet B B, dispensed with, so that the two paths or branches from 53 to 51 would be first directly by wire 126, and resistance 128; and secondly by one or the other of the contacts 54, 52, and resistance lamp 61, 62. In this instance the closing of either contact 52, or 54 would furnish the additional shunt path around a portion of the motor, thus drawing more current from it, and cutting down its speed while the maintenance of the critical speed would, by keeping the branch through contactor 49 open, cause less current to be shunted, and therefore cause a higher speed.

The brake or stop devices may be adjusted so as to come into action when the current through the stop controlling magnet is decreased to any predetermined or desired extent by the change in the adjustment of the controller, or, if desired, they may be made to act only when the current is cut off altogether. This adjustment is attained by proper proportioning of the power of the magnet 20, and the retracting spring or weight 84, which latter may be made adjustable, as well understood in the art. They may be arranged so as to stop and release the motor appliances upon variations in the speed of the operating handle and position controller device actuated thereby, or they may be made to act only when the controller is not in use, and to remain out of action entirely while the controllers are being used.

In describing the operation of the apparatus, Fig. 1, I will assume that they are so adjusted as to come into and out of action with variations in the speed of the controller operating handle 40, thus giving a positive mechanical lock to the driving mechanism on variation in the speed of the handle from a critical speed.

Having described the forms which the various parts of the apparatus may take, I will proceed to describe one way in which they may be electrically connected and operated. Assuming that the apparatus is to be used to bring the several devices from their preliminary stopping positions to the contest starting line or position K, K, Fig. 2, the finish line gate or circuit J, would be in raised position, thus opening the supply circuit at contacts 10, 11. Switch a, is closed to complete the gap thus formed between the generator A, and the supply circuit 12. Switch z, is opened to throw out the manual speed controllers at L, and switches x, and C, are both closed. The circuit of the generator A, through the motor, position circuit breaker and stop device for one of the moving devices would be as follows: Taking for instance the lower motor 24, and the device I³. From one pole of generator A, switch a, wire 12, stop or brake magnet 29, motor 24, position circuit controller 16 (which stands in closed position with its contact closed at h, unless the device is on the finish line with the cam 36, in position to open the circuit at h), to the corresponding contact of the switch C, wire 4, switch x, which is closed, and back to the generator. A similar connection exists for the motor and stop device of each of the movable devices. The switches x and C, having been first closed, the closure of switch a, will complete the circuit described, whereby the brake or stop controlling windings or magnets 20, 19, 18, 17, will attract their armatures, thus removing the brakes or stops D, from the brake or stop wheels 56, and thus freeing the mechanisms, so that they may be rotated by the motors through all of which the electric current now circulates.

I have described the brake magnet or winding 20, and motor as being in series with one another, but do not desire to limit the winding to this special connection or purpose.

The motors, when energized, will begin to rotate all the devices I, I', I², I³, excepting such as may have stopped on the finish line, so as to break the motor connection at the finish line circuit breaker J. As the devices move, their respective lugs upon the gear wheels move with them until they reach the arms of the position circuit breakers. As soon as any lug reaches the arm, it lifts the same, thereby opening the circuit for the corresponding stop magnet and motor at the point h, thus cutting off the supply of energy to the motor, and at the same time causing the brake or stop D, to be applied so as to bring the corresponding device to instant rest on the starting line. As each device reaches the starting line, no matter what preliminary or temporary position it may be in when the operation begins, it will come to final rest. As soon as they are all in line, the switches a, C, and x, are opened. The finish line circuit breaker J, is now swung down and latched down under the contact 10, and upon the closure of switch z, the circuits of the motor, stop controlling magnets and controllers at L, will all be closed, and the devices in condition for operation in a race, each master-controller handle 40, being manipulated by one of the parties engaged in the contest of bringing his selected device I, I', I², I³, first to the finish line. The circuit from the generator A, will in this case be as follows: through switch contacts 10, 11, wire 12, stop controlling magnet 29, motor 24, wire 53, speed controller contacts and circuits of the devices at L, wire 51, and back by way of switch z, to the generator A.

The four persons using the apparatus being all ready to rotate the handles 40, the circuit, before rotation begins, will, in each controller device, be either through an unshunted resistance 61, or in some forms of my invention, said circuit might be open in the controller apparatus. If open, or said resistance is great, it is obvious that the motors will not begin to act; but assuming that the circuit is complete through a resistance such as 61, the stop magnets will withdraw the stops D, and the motors will begin to turn and move the several devices I, I', I², I³, but at a comparatively slow speed. Each contestant now begins to rotate the handle 40, selected by him with the purpose of changing the speed condition, so as to increase the speed. If the speed at which the handle is rotated is the critical speed before described, it will complete the shunt around 61, while maintaining that around 62, and the speed of the motor will increase, both resistances 62, 61, being shunted from the circuit, but if such critical speed is exceeded by the operator, then the resistance in the circuit of the motor will be again increased through breakage of the shunt around resistance 62.

As it is a difficult matter in some of the arrangements herein shown and described to maintain constantly the critical speed which will give the highest speed of the devices I, I', I², I³, there may be many variations in the speed of the controllers and of the associated devices, and those persons who exhibit the most skill and judgment in the turning of the handle will bring their devices to the front; but the first of the devices to reach the trip device J, will bring all of the devices to rest in the positions which they may occupy at that instant. This arrest of all the devices results from the engagement with the trip device J, so as to open the main supply circuit already described, thus cutting off the current from the driving motors and stop magnets, which latter act, as already explained, to instantly bring the brake devices into play, so as to lock the several mechanisms.

When it is desired to prepare the apparatus for another operation, the switch $a$ is closed, as also switches C and $x$; switch $z$ being also opened.

It has been assumed in the foregoing description that the magnet 20, will remove the brake device, and allow the motor to operate as soon as the circuit is completed by the switch $z$, and the current is allowed to flow through said magnet, and the resistance 61, of the stop controller. The adjustment may, however, be such that the brake or stop will not be removed until the controller operating handle 40, is operated at the critical speed which will complete the shunt around both resistances 61, 62. When so adjusted the general operation is the same, excepting that the moving device selected by each operator will not begin to move until he succeeds in operating the handle 40, at the critical speed, and that every time he departs from that critical speed by moving the handle either too slowly or too rapidly, the motor will come to rest instead of slowing down. In either case when the master-controller speed is too low, the indicator lamp 61, will glow, and whenever the speed is too high, the lamp 62, will shine as an indicator. The lighting and extinguishing of the lamps may serve as a guide to the operator in assisting him in maintaining the critical speed, but it is sometimes desirable that no indication should be given him beyond the apparent speed of the controlled devices I, I', I², I³, in which case the lamps may be replaced by other forms of resistance, or may be omitted.

Another way of using the apparatus is as follows: Assume that it is desired to have one of the devices, such for instance as I, move at an uninterrupted predetermined speed free from manual control, which speed may be, say one-half its possible speed, while the other three devices are caused to travel at the greatest speed that the controller operators can obtain from them. In other words, let it be supposed that it is desired to have the device I, act as a "pace maker." For this purpose the switch $d$, is provided, which is adapted to shunt out the controller apparatus L, for device I. The shunt or branch contains a suitable resistance, which should be less than either of the resistances 61, 62, and should also be such as to allow current to pass in sufficient amount to keep the stop or detent D, out of action. Assuming that the circuits are arranged as before described for the contest, device I, will move at a constant speed, and the others will follow after at a speed dependent upon the manner in which their master-controller handles 40, are operated. As will be obvious, if the speed controller contacts of any one of such devices are maintained in condition to cut out both resistances 62, 61, during the greater part of the time the corresponding device will move faster than device I, but if the operator is not successful in maintaining the critical speed, then the device will tend to fall behind the pace maker device.

In Fig. 5. I show a master-switch mechanism, which is intended as a substitute for the individual switches $a$, C, $d$, $x$ and $z$, shown and described in connection with Fig. 1. The lever W, has its contact plates so arranged that as the lever is moved in one direction the contacts indicated by brackets $a$, $x$, C, are closed, each set of contacts being controlled by its appropriate insulated part or plate of lever W, as plainly shown in the drawings. When lever W, is moved toward the opposite end of its path, contacts $z$, are closed, and by a further direct movement of said lever contacts $d$, are closed. It will be seen that the contacts $d$, $z$, in Fig. 5, are so located with reference to the lever W, as to permit the apparatus to be employed in either of the ways described, since the lever may be moved to complete switch connections $z$, without completing the switch connections $d$. A further movement, however, will also complete $d$, thus permitting the pace maker operation already set forth. It is obvious from the foregoing that this master-switch mechanism is adapted to govern all of the circuits leading to all of the motor-controllers, which are arranged in multiple, and governed by the several master-controller-mechanisms.

Fig. 4. illustrates a modification in the construction of the mechanism wherein the driving apparatus is arranged above the surface of the track or way, and the driven devices are supported upon the rails 106, and may be propelled over said rails in any suitable way and by any suitable motor-connection. In Fig. 4, the controllers are supported upon the driven car, and arranged to be manipulated by a motor-man riding on the car. The circuit for the motors is through the appropriate wires, the rails and wheels on one side, to the controller device on the driven car, thence to the wheels and rails on the other side to the return wire 108 back to generator A, from whose opposite pole the connections are taken to the several motors, and by wires 105, to the rail and car wheel, as already explained. An adjustable resistance, 99, may be interposed in the main circuit for regulating the current. In this arrangement the cars are flexibly connected (by any suitable means) to the propelling apparatus, so that, if the track is made undulating or otherwise abnormal, the cars will be able to follow the track. The controller mechanism may be of any suitable kind or construction. When the current passes through the wheels of the traveling vehicle and the rails, as described and shown in Fig. 4, the wheels on one side of the car must be insulated from those on the other side.

Contactor 49, may act upon the arrangement of circuits, such as shown in Fig. 7, either directly or indirectly. I have shown it as acting through the agency of the contactor 50. I have illustrated the controller circuit as formed from 65, through contactor 49, contactor 50, and then through a controlling resistance to a continuation 51, but connection from 65 to the contactor 50, might be formed directly. In this arrangement a critical or intermediate position contact, 72, is connected directly to the wire 51, and on either side of the contact 72, is a variable resistance and appropriate contacts, so arranged that as the contactor 50, moves in either direction from the intermediate position contact 72, the resistance in the circuit will be increased.

Terminal contacts 70, and 71, connect with wires 51, through resistances 61, 62, which may be signal lamps, or other indicators. In this arrangement, if contactor 50, is made to rest on the contact 72, when the critical or predetermined speed of rotation is maintained by the operating handles 40, any departure from the intermediate position contact in either direction will increase the resistance, and slow down the motor, and the operator is left wholly to judge of any small departure by observing the change of speed of the moving device. When, however, he departs widely from the appropriate speeds, so that the contactor 50, is moved to the contact 70, 71, then the lamp 61, or 62 will glow. The contact 70, will be reached through decreasing the speed; and the contact 71, by increasing the speed. The resistances 61, and 62, may be made such that the motor will be stopped by the action of the stop devices, which are adjusted or arranged in this case to come into play on sufficient decrease of the current on the circuit without necessarily an absolute cut off of current.

It is obvious that the variable resistance to either side of contact 72, may be graded or arranged in any suitable way to increase or decrease by arbitrary or irregular steps or degrees. The small variations from the critical speed can, as above stated, only be noted by observing the speed of the driven device, but if the variation is sufficient, the operator is notified by the signal 61, if the speed is decreased sufficiently, and by the signal 62, if it is increased sufficiently. When contactor 50, rests upon contact 72, such contactor and contact constitute a pair of contacts; but such contacts cease to exist as a pair when said contactor 50, moves to another contact; this latter contact and contactor 50, constitute a different pair of contacts from that which existed when contactor 50, and contact 72, were operating together.

To provide for positive locking or stopping of the devices, a toothed stop wheel, such as 56, shown in Fig. 8, may be employed in connection with a stop or detent D, of proper form to engage between the teeth of said wheel. The controlling magnet or solenoid 20, may be connected with the circuits in any desired way, as for instance by joining the terminals 81, 82, into a series circuit with the motor, or by otherwise connecting them across the leads from the source of current. The stop D, will then be held out of engagement with wheel 56, until the circuit is broken or current thereon sufficiently weakened to allow the spring 84, to act, so that when current ceases to flow in the motor it will be instantly stopped. It is sometimes preferable to give the stop or detent a motion into or out of engagement with the stop wheel, thus allowing practically a step by step, or clock-like movement of the motor under the influence of the driving power, so long as current passes in sufficient amount through the control magnet of the stop. The speed of the motor, or the extent to which the same shall move the device I, I', I$^2$, I$^3$, will correspond exactly with the time during which the circuits are maintained by the operator in critical or predetermined condition, the effect of momentum or inertia being thereby eliminated as a disturbing factor. To give this vibratory motion to the stop or detent, I may provide the lever for the coil or magnet 20, with an appropriate electric make and break, so arranged that when there is sufficient current flowing, the lever will be given a vibratory motion, and the detent will allow the wheel 56, and connected motor to move practically step by step. At 85, the contacts of a make and break of this character are indicated, the circuit of the coil 20, being, when this operation is desired, from the terminal 83, to the lever and make and break contact 85, and thence through the coils 20, to terminal 81. By connecting the terminals 82, 81, across the leads from the source of current, the brake or stop will be held out of contact or engagement with the stop wheel continuously until the circuit is broken, or the flow of current thereon sufficiently decreased, owing to the interposition of a resistance, or by other means to permit the spring 84, to throw the stop or brake into engagement with wheel 56, thus instantly stopping the motor. If terminal 83, be used instead of 82, then the stop will vibrate into and out of engagement with the wheel, through the action of the automatic make and break contact 85, thus allowing limited movement, or as it were, a step by step movement of the motor and actuated devices at each vibration of the stop movement. When this action is employed it is best to use low resistance lamps, so that enough current will pass to the motor to operate it slowly as soon as the circuit is closed, and independently of any change in the circuits of the controller through the operation of the handle. This current should also be sufficient to cause the brake or stop lever to vibrate automatically. When the resistance upon the circuit is decreased by the proper operation of the handle, more current will flow, and cause the motor and the brake or stop lever to vibrate faster.

Fig. 9, illustrates a further modification of the brake or stop device. The brake shoe D, is attached to the brake lever D$^2$ by a spring D', and the parts are preferably so adjusted that when the brake lever pulls away from the brake wheel 56, under the action of the magnet or other device, the said brake shoe will be kept lightly in contact with the surface of the brake wheel 56. When the brake "goes on" under the action of the spring 84, attached to the brake lever, the pressure between the brake shoe and brake wheel is increased, but owing to the presence of the spring D', which yields as the lever goes down, a shock is prevented. The brake wheel 56, is not fast upon the motor shaft, but is yieldingly connected therewith by means of a spring 100, which is attached on one end to said wheel, and at the other to said shaft. This spring serves to prevent shock from the momentum of the armature when the brake "goes on" hard. The brake lever carries a core of the solenoid 20, which operates on the brake lever in a direction to relieve the pressure of the shoe on the brake lever sufficiently to permit the motor to operate. The lever carries also, however, an automatic make and break contact indicated at 92, which is included in the circuit of the coil 20, so that the said brake lever will automatically vibrate when current flows in sufficient amount through the coil or winding 20, to overcome the retractor or spring 84, which operates in a direction to apply the brakes.

The resistance 93, in shunt around the vibrator contacts 92, is for the purpose of preventing sparking. This arrangement causes the brake to "go on" hard after each break of the circuit, thus preventing the motor from operating by momentum after the circuit is cut off. While the current is supplied in sufficient amount to operate the motor and solenoid, the brake reciprocates, and alternately stops and releases the brake wheel, allowing the same to move by a step by step movement. The brake controlling magnet is placed in a shunt around the resistance 88, said resistance and coil being in multiple with one another in the circuit from 53 to 51, but in series with the motor and the circuit controlling devices, which are adjusted by the operating handle, as before explained. When the controller is at rest the circuit is from 53, over the contactor 49, and contactor 50, through lamp resistance 61, to point 90, where a division takes place, a portion of the energy being shunted around resistance 88, through the solenoid coils 20. After a union of the branches the circuit passes through the motor to 51, as indicated. The contacts at 92, being closed, a very small portion of the current will pass through the resistance 93; the rest passes through the contacts 92, and the brake lever to 94. The current thus flowing from 53, to 51, through lamp resistance 61, is sufficient to cause solenoid magnet to make and break circuit at point 92, thus alternately relieving and increasing the pressure upon the brake shoe, and permitting a slow motion of the motor. When the master-controller handle is operated, and the contact is permitted to close at 52, so as to complete a low resistance path around the lamp 61, more current will flow both in the solenoid coil 20 and the motor, thus increasing the torque of the motor, and widening the variations of pressure upon the brake wheel, owing to the wider vibrations of the brake lever. The greater the variations of the brake pressure and the greater the torque of the motor, the faster and further it will move at each vibration of the brake lever. The brake operates practically to stop or nearly stop the motor once each time the circuit of the solenoid is broken at the contacts 92. Each step forward of the motor coincident with each release of the brake pressure will be in proportion to the current supplied thereto, and the variations in the amount of current and the consequent speed of the motor and actuated device will, as already explained, depend entirely upon the skill with which the operator manipulates the handle of the master-controller.

Instead of a ball governor or similar mechanical device responsive to changes in the speed of operation of the handle 40, electric or other energy may be controlled in any suitable way by the manipulation of a handle. Such energy is made to act through a solenoid or other energy transferring device upon the speed controller of the motor in varying degrees, just as the varying centrifugal force of the ball governor master-controller in Fig. 1. One way of carrying out this modification of my invention is shown in Fig. 10, wherein $A'$ is the armature of an electric generator (master-controller) of any type, operated by handle 40 in a suitable magnetic field produced by a magnet (permanent or electro) $A^2$. The electric energy so generated is conveyed by suitable conductors to the coils of the solenoid, or other electro magnet B, whose movable core is mechanically connected with the operative portion of the speed controller, and acts against a restraining or opposing force, such as a spring weight or other device of variable effect, according to the position of the parts, so that in order to maintain the motor circuit contactors in a certain position, the handle 40, must be operated at the required speed, and thus generate the required amount of energy for operation on the solenoid. In the present instance, a weight 117, is shown, which is connected to the solenoid core by a cord or band running over wheels 37, 38, the former of which is an eccentric, as shown, so that as the weight is raised by an increasing power, the weight will act with an increasing leverage or value. The contactor 49 is in this instance suitably connected with the wheel 38, or shaft thereof, so as to swing against the contactor 50, which in turn is adapted to rest upon a contact stop, 64, of any desired form. When the contactor 49 acts as an electric contact, connection therewith may be made by the shaft and pulley, or wheel 38, these parts being in such case of metal. The circuits and connections shown are substantially the same as those of the controller apparatus at L, Fig. 1, but any other connections might be used, and the contactor 50 and contact 64, and the contactor 49, might operate in other ways as a circuit or speed controller.

The operation of the device is as follows: When the master-controller armature $A'$ is turned rapidly by handle 40, the electric current will increase as the motion of the handle increases in speed, and the pull of the solenoid on its core will increase with the increase of the current. As the core moves downward it swings the contactor 49, over until it makes connection with contactor 50, thus completing the shunt around the resistances 62, 61, by way of contactor 50 and contact 64, and if the speed of the armature be kept constant, the shunt will be maintained. If the speed of revolution be increased, the pull of the solenoid will increase, thus pulling contactor 49, further over against the restraining effect of the weight 17, and opening the contact between 50, and 64, while, if the speed of the armature decrease, the weight will move the contactor 49, backward, and open contact between 49, and contactor 50. Obviously it is not necessary that the weight 17, should have an increasing effect as it rises, but the cord might run over on 37, with a concentric axis. In this case the contactor 50 could operate as an opposing weight, which would maintain the shunt closed through 49, 50, 64, until the energy of the solenoid was increased above the critical amount, and sufficiently to overcome both weights, while decrease of speed and resultant energy would, as before, result in the opening of contact between 50, and 64, through the action of weight 117.

In Fig. 11, I show a further modification in the means for causing the speed controller to assume and maintain a certain position when the operating or controlling handle is operated at a certain or critical speed. In this case the varying force or agent which responds to or varies with the speed of operation of the handle or its connected parts is friction. The contactor 49, projects from a shaft, which carries a wheel 38, frictionally engaged by a wheel 120, which is directly or indirectly rotated by the operating handle. A weight 117, suspended from a cord wound upon a drum of the shaft carrying wheel 38, tends to move the contactor 49, in one direction, while the wheel 120, when rotated in an opposite direction, tends by frictional engagement with the drum to move the drum and contactor 49, in the opposite direction against the action of the weight. The friction is adjusted, so that there shall be a slip between the wheel 120 and drum 38. The speed at which the wheel is rotated determines its ability to keep the weight lifted and the contactor 49, in a position which it will engage the contactor 50. An increase of the speed carries contactor 49, beyond the desired point, and a decrease allows the weight to pull contactor 49, back. The wheel 120, may be a fly wheel, and may be operated in any desired way. One way is by pivotally supporting the handle 40, upon any suitable support, as for instance, the shaft for the fly wheel 120, and providing it with a dog or pawl 1, that is adapted to engage the ratchet wheel 119, secured to wheel 120. When the handle 40, is given a quick movement in a direction to cause the pawl to engage the teeth of the wheel 119, the wheel 120, will be set in motion, and when its speed is high enough, the weight 117, will be lifted, and the contactor 49, will be drawn over to the right. To maintain the motion of the contactor 49, and to bring it to engagement, the handle will have to be rocked to and fro to keep the wheel 120, in rotation, and the speed with which it is reciprocated and the consequent speed of the wheel 120, will determine the distance to which the weight shall be maintained. If the speed of the wheel 120, is allowed to decrease, the weight will fall back, carrying with it the contactor 49, while, if the speed be increased, the weight will be lifted, and the contactor 49, carried over far enough to break the connection at contacts 64. The circuit from 3 to 4 is through the contactor 49, contactor 50, and contact 52. If said circuit be that for the generator and motor, then the circuit will be cut off from the motor when the speed of rotation of the wheel 120, under the impulse communicated from the handle 40, varies from that which will keep the contactor 49, engaged with the contactor 50, and without lifting the said contactor 50, from engagement with the contact 64.

Figure 6:
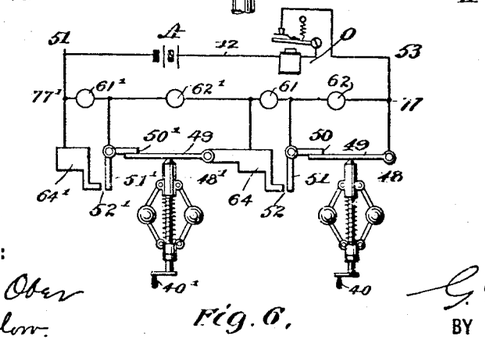
Fig. 6 illustrates a modification of the controlling apparatus, which I term a duplex controller.

Fig. 6, illustrates a modification of the invention wherein two controllers are combined in such manner that, in order to produce the desired effect upon the circuit or apparatus, upon which they act together, the controller handles must be simultaneously operated at a certain or arbitrary relative speed. Preferably the speed required is different for the two handles, and the relation or ratio of speeds may be anything desired. The controllers may be electrically or mechanically combined, and the critical speed for each when operated by its handle 40, may be attained through mechanical or electrical devices, or through other devices responsive to changes in the speed of operation of the handles. Electrical devices for this purpose will be described further on.

In Fig. 6, the invention is illustrated as carried out by the use of a mechanical device, such as already described, wherein advantage is taken of centrifugal force, tending to move the governor balls outwardly against the action of the spring, or other suitable retractor, which weighs, as it were, the amount of centrifugal force, said balls by their movement imparting movement to the controller device proper.

In the figure, O, represents any energy translating device, in which it is desired to obtain a maximum or arbitrary effect by operation of the two master-controller handles, 40, 40', at a certain arbitrary or critical relative speed. When the controller devices themselves are electrical in their action, device O, is any electro magnet or other translating device energized or operated by current from a generator A, which, with the magnet is in the circuit 12, between points 51, 53. This circuit is completed through the circuit controlling devices and contacts. The device O, may be the electric magnet which controls the stop device or mechanism already described, and may have an automatically vibrated armature lever, as will be described in connection with Fig. 8, or said magnet may be an electric motor magnet, or a magnet for any other electrical apparatus. The circuit of the generator and magnet O, is through electric controller contacts, which when the handles 40, 40' are operated at the critical speed will complete a shunt around the resistance lamps 62, 61, 62', 61'. The master-controller devices governed by handle 40 may be similar to those already described, as embodied in the controller mechanism L, Fig. 1, and may operate to govern the shunt around the two lamps 62, 61, in similar manner. Similar devices 49', 50' and 64' are used in connection with the handle 40' for governing the shunts around the two signal lamps 62', 61'.

The stop contact 64, for controller handle 40, is connected to the series circuit, including lamps 62, 61, 62', 61', at a point between lamps 62', 61, and is also in connection with the contactor 49, which is governed by the action of handle 40'. A convenient connection is afforded by pivoting the contactor 49, on the stop 64. As will be seen, when all the contacts of both controllers are closed, there is a complete connection from points 77, at one end of the series of lamps, to the point 77', to which contact 64' is joined at the other end of the series, so that all of said lamps are shunted out of circuit, and the current will flow in the device O, with the maximum strength. It is also obvious that this complete shunt connection will be broken in case either handle 40, or 40' is not operated at such a critical speed as will maintain the connection at both of the controlled contacts of the contactor 49, or 49'. Should handle 40, be operated at a higher than the critical speed, the shunt around lamp 62, will be broken, and said lamp will be thrown into circuit with generator A, the connection being from 77, to 62, contactor 49, contactor 50, and contact 64, in which case the remaining lamps will be still shunted. If the handle is operated at a lower than the critical speed, then the lamp 61, will be thrown into the circuit by the opening of the shunt at contact 52, the shunt around lamp 62, being still kept closed, and the circuit then being from 77, through contactors 49, 50, lamp 61, contact 64, and then through the contacts which shunt lamps 62', 61', provided that the master-controller handle 40' is being operated at the critical speed. Should it happen, however, that the handle 40' is not being operated at the appropriate speed, then the shunt around one or the other of the lamps 62', 61' will be opened, and the circuit which, as just described, includes the lamp 61, will also include in series with said lamp one or other of the lamps 62', 61'. It will therefore happen that if the speed of operation of either handle departs from the critical speed, one of the series of lamps will have its resistance shunted into the circuit. If both depart from that critical speed, two lamps will be included in the circuit in series with one another. All can be shunted out of circuit only by operating the two handles each at the determinate speed that will keep both the contacts of its controller apparatus closed. The relation of speed necessary to produce this result may obviously be determined by the relative adjustment of the retractor springs upon the ball governor, or by adjustment of the position of the contacts 64, 64' with relation to the arms 51, 51' or the contactors 50, 50'. The lamps, as before, serve to give an indication that the critical speed is exceeded or diminished in either controller handle.

By assigning to each operator two handles 40, 40', which require to be operated at different speeds, it is obvious that the skill required to get the maximum effects in the motor driving device, or in any other device to be operated in competition with other operators will be greatly enhanced, and the interest in the contest increased.

I do not limit myself to the particular arrangement of circuits, lamps and contact devices illustrated in Fig. 6, as it is quite obvious that other dispositions of circuit resistances and other connections governing the speed or other action of the device, O might be employed, the arrangement being in any case such that the particular ratio of speed must be maintained in the two handles to get the effect desired.

Fig. 12, illustrates another modification of my invention, in which I show two master-controller operating devices or handles, 40, 40', so combined through intermediate devices, that, in order to produce the desired effect, the said handles must be operated each at a critical speed different from the speed of the other device. In carrying out this part of my invention the intermediate mechanism to effect this result may be electrical or mechanical, but I have herein shown the invention as carried out by causing the handles to generate electrical energy, which operates upon the circuit controller, indicator, or other device which it is desired to maintain in a certain position, or in which it is desired to produce a certain effect.

Referring to the drawing, B, is the solenoid or magnet which by suitable cord and transverse arm is made to operate upon the contactor 49, adapted to move over an arc 11, which may be provided with electrical contact apparatus arranged in any suitable way. 117, is a counter-weight that serves to restrain the contactor 49, and to tend to cause it to assume an upright position. The two master-controller armatures A, operated by the handles 40, 40', operate in magnetic fields produced or controlled by coils 1, 6, 3, as shown, that for the armature operated by handle 40, being compounded from the combined effects of coils 1, 6. Armature operated by handle 40, delivers a part of its current through shunt field coil 1, of its own field magnet; the other portion of the current of said armature passes by wire 2, through field coil 3, for the armature operated by handle 40', thus energizing the field magnet therefor. 4, is the return wire for field energizing coil 3. The armature operated by handle 40' delivers its energy through wires 8, 7, 5, in the circuit of which are included the coils for solenoid B, and also the coil 6, for the field magnet of handle-40-armature. As will be noted, the current of armature controlled by handle 40, energizes the field magnets of both generators, but the energy produced by the rotation of handle 40', by passing through coil 6, wound in a manner to oppose the magnetizing effect of coil 1, tends to cut down the energy generated by the rotation of the handle 40. Preferably the windings of coils 1, 3, 6, are so proportioned that if the armatures are rotated at the same speed by manual power applied to the handles 40, 40', very little current will flow in the coil B, this being due to the fact that the current in the coil 6, counteracts the effect of the shunt current in coil 1, so that the field in which the armature (operated by handle 40) operates, is very weak; hence the current generated thereby and energizing the field for the armature operated handle 40' will be weak. If the master-controller handle 40, is being operated at full speed, say 100 revolutions a minute, then to get the critical or desired effect in the solenoid B, and connected mechanism, handle 40' must be operated at some lower or different speed; thus, for instance, handle 40, being operated at 100 revolutions per minute, 50 revolutions only per minute for handle 40' may be necessary. When the handles are operated at the necessary relative speed the current in coil B, will cause its cord to be drawn down, until the weight 117, counter-balances the magnetic pull, the degree of motion of the connector 49, being indicated on the sector or arc 11, or the result being otherwise observable or realized.

Figure 14:
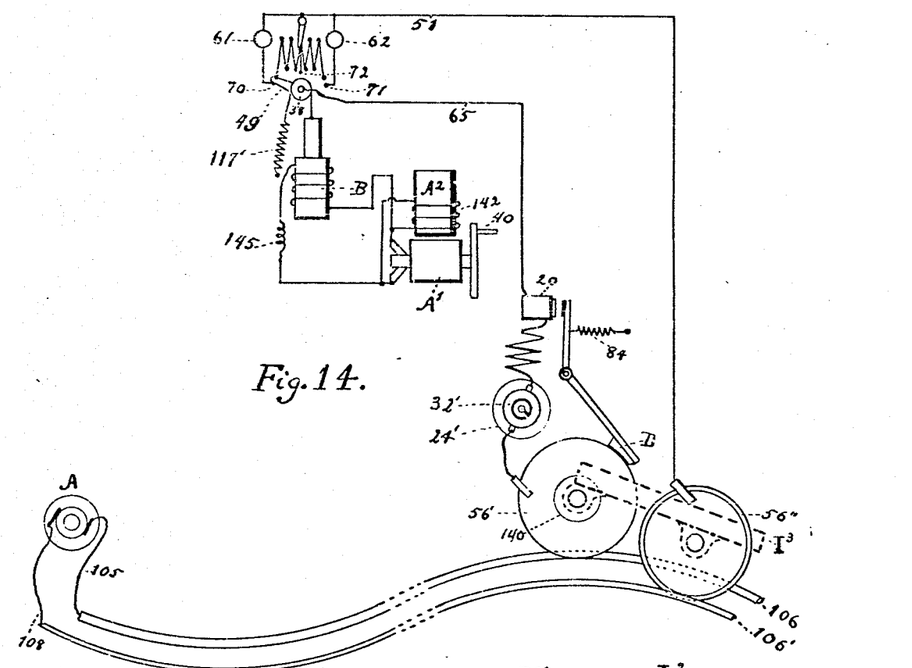
Fig. 14 is a diagrammatic side view of an undulating track and a car arranged thereon with its controlling and propelling apparatus.

In Fig. 14, the rails 106, 106' are so arranged that when the car apparatus is moving along the rails, it will be given an undulating motion in addition to its forward motion. When the said rails are properly arranged, the undulating motion will be gradual, and thus add to the pleasure of those riding on the car. The dotted lines I³ represent the body of a car or other vehicle, which rests upon wheels 56', 56'', and these wheels travel upon rails 106, 106', and thereby electrically communicate with generator A. Magnet 20, and spring 84, represent any suitable means for "putting on" and "taking off" brake D. Such magnet and spring receive their energy from the same source, which supplies operative energy to motor 24'. The magnet may be in series with the latter motor, or not, as heretofore stated. The master-controller A', A², and the solenoid apparatus B, &c., of the motor circuit controller are constructed and arranged in practically the same manner as parts of apparatus shown and described in connection with Figs. 7, 10 and 12, that is to say, the solenoid B, contactor 49, and master-controller A', A² are substantially the same illustrated in Fig. 10, except the coil 142, (of magnet A²), which is shown in Fig. 12. The contactor 49, is arranged to move in connection with a resistance device which is substantially as shown in Fig. 7. The motor circuit controller comprises the solenoid B, the resistance at 72, and the means whereby said solenoid changes said resistance to vary the speed or work of the driving motor.

Figure 15:
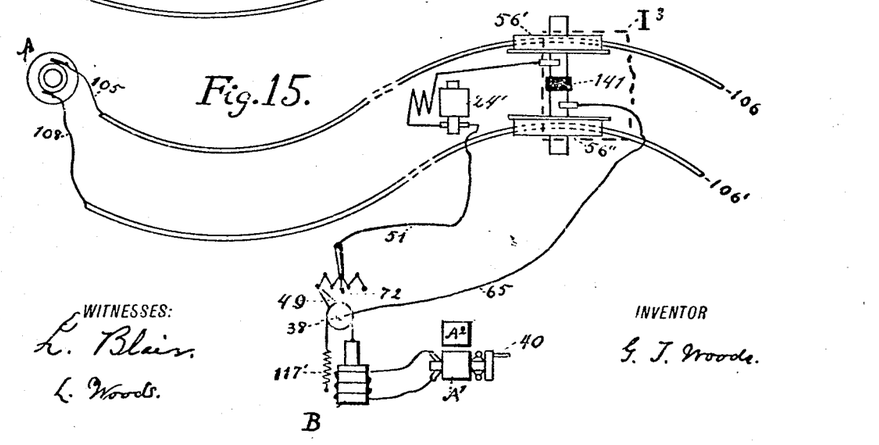
Fig. 15 is a diagrammatic plan view of a sinuous track with a car with propelling and controlling apparatus arranged upon the rails thereof.

In Fig. 15, the rails (106) of the railroad are arranged in a sinuous manner; when a car or other vehicle is operated over such track, the movement should be slow, if the curves are short, so as to avoid causing the passengers to have unpleasant sensations as the car "rounds" the curves. The dotted lines I³ represent a portion of a car body, which rests upon the wheels (56', 56'') which are connected together by a two-part axle; such axle parts being insulated from each other by means of the insulation 141. It will be noticed that contactor 50, is a member of the motor-circuit controller, but is not a member of the master (or manually-operated) controller, and that the master-controller armature (A') may have a plurality of electro-magnetic devices in circuit therewith. It will also be seen that in some instances (as in Fig. 1) the spring 43, flexibly connects some parts of the master-controller to the motor-controller, and also aids in conveying energy between the master-controller handle, and the motor-controller; in other instances (as in Fig. 10) electrical conductors flexibly connect the armature part of the master-controller to the solenoid of the motor-controller, and also convey energy between the master-controller handle and said motor-controller; there is also a flexible connection between the motor and the motor-controller. It will be noted that the result sought to be obtained by the operation of the handles at 40, 40' can be only obtained by operating them at a predetermined critical ratio of speed.

It is obvious that other forms of energy translating device or indicating apparatus might be substituted for the magnet or coil B, and for the device controlled or actuated by the same.

It will be observed that the element of chance or guess work is entirely eliminated from the operation or control of the apparatus. The result sought to be obtained by the operation of the apparatus is acquired by the operators in exact proportion to their skilful manual operation of the master-controller handles.

I wish it understood that the following claims are intended to apply to and cover broadly any mechanism or apparatus (independently of the size thereof, and of the purpose for which such mechanism or apparatus is employed), which comes within the scope of said claims:

I claim:

1. The combination of a source of electrical supply, provided with a supply circuit, a traveling railway or railroad car, an electrical motor electrically communicating with said supply circuit, and connected to said car to drive the same, a plurality of contacts arranged to be brought in circuit with said motor, to govern the speed thereof, an energy conveying coil outside of said supply circuit, and manually operable means, also outside of said supply circuit, and operating in connection with said energy conveying coil to control the operation of said motor.

2. The combination of the rails of a railway, a car or vehicle traveling thereon, an electric motor operatively connected to said car or vehicle to drive the same, a source of electrical supply communicating with said motor, a plurality of pairs of contacts arranged to influence the speed of said motor, and a manually operable device whereby the contacts of one of said pairs of contacts, are connected together and caused to influence the condition of another one of said pairs of contacts.

3. The combination of the rails of a railway, a car or vehicle traveling thereon, an electric motor operatively connected to said car or vehicle to drive the same, a source of electrical supply communicating with said motor, a plurality of contacts arranged to be brought pair by pair into the motor circuit to influence the speed thereof, governing means for said contacts, and a manually operable master-controller provided with flexible means for conveying energy between said master-controller and said governing means to control the latter apparatus.

4. An electrically driven car carrying two unlike controllers provided with flexible means which convey energy between such controllers to influence the speed of the car; one of such controllers being manually operable and constructed to influence the action of the other controller.

5. The combination of an electrical supply circuit, a traveling motor driven railway or railroad car, an electrical driving motor operatively connected thereto and obtaining energy transferred from said supply circuit, an electro-inductive winding outside of said supply circuit and arranged to cause the transfer of energy from said supply circuit to said motor, and manually operable means whereby the electro-inductive action of said winding is changed to vary the amount of energy supplied to said motor.

6. The combination of a power operated motive device, controller-apparatus therefor operating independently of the action of said motive-device, and means constructed and arranged to automatically and instantly signal when the speed of operation of said apparatus becomes either too high or too low.

7. The combination of a power operated motive-device, controller apparatus therefor operating independently of the action of said motive-device, and two signal devices, the construction and arrangement being such that one signal device is brought into action the instant the operation of said apparatus becomes too fast, the other signal device being actuated the instant the speed of operation of said apparatus becomes too slow.

8. In an electrical system, the combination of a car, a motive device provided with a rotative member which is controlled on said car and operatively connected thereto to propel the same, a source of electrical supply for said motor, an electro-energizable winding, arranged upon said car, and adapted to cause a change in the active condition of said rotative member of said motive device, and means upon said car, and outside of the circuit containing said source of supply, and arranged to control the energy affecting said winding; said means being provided with a manually operable handle.

9. An electric motor driven car or vehicle having a driving motor and carrying two unlike controllers provided with a connection between them, and arranged to influence the speed of said car or vehicle; one of such controllers being adapted and arranged to control the circuit of said motor, the remaining controller being manually operable, and adapted and arranged to influence the action of said motor-circuit controller; the arrangement being such that any predetermined movement of said manually operable controller will cause the condition of said motor circuit-controller to be changed immediately thereafter.

10. The combination of a railway car or vehicle, an electrical motor to propel the same, a source of electrical supply electrically communicating with said motor, a plurality of motor-circuit controlling contacts connectible in pairs, in circuit with said motor, and carried by said car or vehicle, electrical-apparatus for actuating said contacts, and a manually operable master-controller flexibly joined to said electrical apparatus to govern the same.

11. The combination of a railway car or vehicle, an electrical motor operatively connected to said car or vehicle to propel the same, a source of electrical supply electrically communicating with said motor, a plurality of contacts arranged in circuit with said motor and adapted to change the speed thereof, power operated apparatus for governing said contacts, a manually operable master-controller for governing said power operated apparatus, flexible connections between said master-controller and said power operated apparatus, which are independent of the circuit which contains the motor, a brake, an elastic medium for forcing the brake to set, electro-mechanical apparatus taking energy from said source of electrical supply to change the condition of said elastic medium, and apparatus adapted to automatically cause said motors to become idle and said brake to set.

12. In combination, a source of electrical supply, a motor electrically communicating therewith, and operatively connected to a moving car or vehicle, a circuit electrically communicating with said motor, motor-circuit controlling contacts for changing the speed of the motor, apparatus for actuating said contacts, a manually operable master-controller provided with flexible means for conveying energy to govern said contact actuating apparatus; a brake, an elastic medium for forcing the brake to set, electro-mechanical apparatus taking energy from said electrical source to change the condition of said elastic medium, and a tripping device arranged along the path of said moving car or vehicle, and adapted to be engaged by some portion of such car or vehicle to cause said motor to become idle, and said brake to set independently of the master controller.

13. The combination of the rails of a railway, a car or vehicle thereon, an electrical motor operatively connected to said car or vehicle, to drive the same, a source of electrical supply electrically communicating with said motor, a plurality of fixed contacts, and a movable contact for changing the speed or work of said motor, a device constructed and arranged to actuate said movable contact, and a manually operable master-controller provided with flexible means for conveying energy between said master-controller and said contact actuating device, to govern the same; the arrangement being such that any change in the condition of said master-controller will instantly cause a change in the condition of said motor.

14. The combination of the rails of a railway, a car or vehicle thereon, an electrical motor operatively connected to said car or vehicle to propel the same, a source of electrical supply electrically communicating with said motor, a plurality of contacts arranged in circuit with the motor, and adapted to change the speed of said motor, a device for actuating said contacts, a manually operable master-controller, in flexible engagement with said contact actuating device, a brake, an elastic medium for forcing the brake to stop the car, and electro-mechanical apparatus taking energy from the said source of electrical supply to change the condition of said elastic medium.

15. The combination of the rails of a railway, a car or vehicle thereon, an electrical motor operatively connected to said car or vehicle to propel the same, a source of electrical supply in electrical communication with said motor, a plurality of contacts arranged in circuit with said motor, and adapted to change the speed thereof, apparatus for governing said contacts, manually operable master-controller mechanism, provided with flexible means carrying energy, for governing said apparatus, a brake, an elastic medium for forcing the brake to set, and electro-mechanical apparatus taking energy from said source of electrical supply to change the condition of said elastic medium; the said master-controller mechanism being so constructed and arranged that when released from manual control the said motor will thereby be automatically caused to become idle, and said brake will be automatically caused to set.

16. The combination of the rails of a railway, a car or vehicle thereon, an electrical motor operatively connected to said car or vehicle, to drive the same, a source of electrical supply electrically communicating with said motor, a plurality of separately actuated contacts carried by said car or vehicle for changing the speed or work of said motor, means for actuating said contacts, and a manually operable master-controller arranged upon said car or vehicle, and adapted to govern the contact actuating means.

17. In an electrical system, the combination of a plurality of cars or vehicles, a plurality of motors operatively connected to said cars or vehicles to propel the same, a plurality of motor-speed-controllers provided with power-circuit contacts for said motors, appropriate circuits containing said motors and the contacts of said motor-speed-controllers, a shunt-circuit, which shunts around said contacts of the motor-speed-controllers, and contains a plurality of contact connections, and a manually operable switch-device whereby said shunt-circuit may be closed at will; the construction and arrangement being such that when said switch device is caused to close said shunt-circuit, the said motors are then caused to become energized practically in unison with one another.

18. In an electrical system, the combination of a source of electrical energy, a plurality of electrical conductors mechanically held in position throughout their length, and electrically communicating with said electrical source, a car, a driving motor electrically communicating with said electrical conductors, a pair of gear wheels of different sizes, the larger wheel being operatively connected to said car, while the smaller wheel is affixed to the shaft of the armature of said motor, and engaged with said larger wheel to drive said car, a plurality of pairs of contacts in circuit with said motor, to change the speed of the same, means for supporting said contacts, and a master-controller provided with a manually operable handle, and arranged for governing said means; the construction and arrangement being such that said motor instantly responds to predetermined movements of said handle.

19. A car or vehicle, motive-apparatus for moving said car or vehicle, a source of power for said motive apparatus, a power controller, and a manually operable master controller provided with a handle and flexibly connected to said power controller; said power controller being adapted and arranged to control the application of the power to said motive apparatus; said master controller handle being arranged upon said car or vehicle to govern the master controller and thereby control the operation of said power controller; the construction and arrangement being such that when manual control of said master controller ceases, the power will be automatically cut off.

20. A car or vehicle, motive-apparatus therefor, a source of power comunicating with said motive-apparatus, and power controller apparatus provided with a manually controllable handle; such handle being arranged upon said car or vehicle and so connected that by the manipulation thereof, the application of power to said motive apparatus is controlled; the construction and arrangement being such that when manual control of said handle ceases the said power will be automatically cut off.

21. The combination of power actuated apparatus, a source of power therefor, and controlling mechanism, for said apparatus, provided with two members and having an accelerating and then a retarding action or vice versa when the condition of one of said members is progressively changed by the speed of operation of the remaining member.

22. The combination of a source of power, a power actuated mechanism communicating therewith, and controlling apparatus, for said mechanism, having an accelerating and then a retarding action or vice versa when the condition of one of the members of the controlling apparatus is automatically and progressively changed by the speed of operation of another member of said controlling apparatus.

23. The combination of a source of power, a power actuated mechanism communicating therewith, and controlling apparatus for said mechanism; one part of said controlling apparatus being so constructed and arranged that its operative condition is automatically changed by a progressive increase of the speed of action of another part of said controlling apparatus and thereby accelerates and then retards, or vice versa, the action of said power actuated mechanism.

24. In a system of the character described, the combination of a plurality of tracks or ways, provided with a finish line, devices independently movable in said tracks or ways, means for causing said devices to traverse said tracks or ways, means for causing all of said devices to simultaneously and instantaneously come to rest, irrespec-
160 tively of their relative positions, upon the leading device reaching the finish line, means for starting all of the devices simultaneously from their respective positions, and causing them to move to a contest starting line, and means for stopping each device as it reaches the starting line.

25. In apparatus of the character described, the combination with a plurality of power operated devices, of an independent controller for each, and means for automatically, simultaneously and instantaneously stopping all of said devices when one of them shall have reached a predetermined position in a contest.

26. The combination with a plurality of power driven figures or vehicles independently actuated, of a power controlled stop-device for each, and an automatically acting power disconnector whereby all of the stop-devices are influenced to act simultaneously and instantaneously when the foremost figure or vehicle reaches a predetermined position.

27. In apparatus of the character described, the combination with a plurality of motor-driven figures or vehicles moving over companion tracks or ways, of a stop device for each figure or vehicle, a magnet controlling the stop-device, and an automatic circuit-breaker governing the action of said magnets, and causing all of said figures or vehicles to instantaneously, automatically and simultaneously come to rest, when the foremost figure or vehicle reaches a predetermined position.

28. The combination with a traveling figure or vehicle, of a motor for driving the figure or vehicle, means for starting the motor to bring the figure or vehicle from a position of rest, different from a starting point, up to said point, means for starting the figure or vehicle from said starting point, and causing it to traverse a course, and means for automatically stopping the motor when the figure or vehicle has reached a point different from the starting line after having traversed the course.

29. The combination with a figure or vehicle, of a motor for driving the figure or vehicle, a stop device for restraining the figure or vehicle against forward movement, a means for releasing said stop device, and for starting the motor to drive the figure or vehicle along a track or way, and means for automatically causing the figure or vehicle to come to rest at a place different from the starting point after the figure or vehicle has traversed the track or way.

30. In an apparatus of the class described, the combination with a plurality of independently driven figures, of driving means for driving the figures, means for starting the driving means, to bring all of the figures from a position of rest, different from a starting point up to said point, and in alinement, means for starting all of the figures simultaneously after they have been alined, and causing them to traverse a course, and means for stopping the driving-means when the figures have each reached a rest position, different from the starting line after having traversed the course.

31. In an apparatus of the class described, the combination with a plurality of independently driven figures, of driving-means for racing the figures, an independent controller for each stop-means for restraining the figures against forward movement, means for releasing said stop-means and for starting the driving means to race the figures, and means for stopping the driving means at the finish of the race, to cause the figures to come to rest each at a point different from the starting line.

32. The combination of a plurality of independently electrically driven devices moving over companion tracks or ways, a starting contact for each device, a stopping contact common to all of said devices, and means for switching all of said starting contacts into the circuit during one space of time, and for switching the stopping contact into the circuit at another time.

33. In apparatus of the character described, the combination with a plurality of electrically driven devices of an independent controller for each such device, and means for automatically and simultaneously stopping all of said devices the instant the foremost one of them has reached a predetermined position in a contest.

34. In apparatus of the character described, the combination with a plurality of moving-devices, of a driving electric motor for each such device, a magnetically controlled stop for each device, and an automatic circuit breaker governing the action of all of the stop-devices to cause all of said moving-devices to come to rest simultaneously independently of their different positions, different from a starting line.

35. In apparatus of the character described, the combination with two or more companion tracks or ways provided with a starting line automatic indicator, and a finish place automatic indicator, the finish place being different from the starting line, of a plurality of independently driven device moving over said tracks or ways, and stop means for restraining the devices against forward movement when they reach the starting line.

36. In apparatus of the character described, the combination with two or more companion tracks or ways, provided with a starting-line automatic indicator, and a finish point automatic indicator, the finish place being different from the starting-line, of a plurality of independently driven devices moving over said tracks or ways, stop-means for restraining the devices against forward movement when they reach the starting-line, and means for releasing said stop-means to permit said devices to be propelled.

37. The combination with the concentric driving shafts, of a driving motor connected to each shaft, a stop device for each shaft, a circuit-breaker for governing the action of each of said stops, and means brought into action by the operation of said motor to actuate the circuit breaker.

38. In apparatus of the character described, the combination with two or more companion tracks or ways provided with a starting point automatic indicator and a finish place automatic indicator, the finish place being different from the starting point, of a plurality of independently driven devices moving over said tracks or ways, and stop means for restraining the devices against forward movement when they reach the finish place after having traversed a course.

39. In an apparatus of the class described, the combination with a plurality of traveling figures, of motive apparatus for driving the figures, means for starting the motive apparatus, to bring the figures from a position of rest up to a starting point, and in alinement, means for starting all of the figures simultaneously after they have been alined, and causing them to traverse a course, and means for stopping the motive apparatus when the figures have reached a point different from the starting line, after having traversed the course.

40. In apparatus, the combination with a plurality of traveling figures, of motive apparatus for racing the figures, stop means for restraining the figures against forward movement, means for releasing said stop means, and for starting the motive apparatus to race the figures, and means for stopping the motive apparatus at the finish of the race to cause the figures to come to rest at a point different from the starting line.

41. The combination with a traveling figure or vehicle, of a driving motor, mechanism whereby the said figure or vehicle is driven by said motor, at a speed different from that of the motor, means for starting the motor to bring the figure or vehicle from a position of rest up to a starting point, means for starting the figure or vehicle from said starting point, and causing it to traverse a course, and means for stopping the motor when the figure or vehicle has reached a point different from the starting point after having traversed the course.

42. The combination with a plurality of traveling figures or vehicles, of driving-means for driving the figures or vehicles, means for starting the motive-apparatus, to bring the figures or vehicles from a position of rest up to a starting point, and in alinement, means for starting all of the figures or vehicles simultaneously after they have been alined, and causing them to traverse a course, means whereby the speed of each of said figures or vehicles may be varied independently, and means for stopping the driving-means when the figures or vehicles have each reached a point different from the starting line, after having traversed the course.

43. The combination with a plurality of traveling figures or vehicles, of driving-means for racing the figures or vehicles, stop-apparatus for restraining the figures or vehicles against forward movement, means for releasing said stop apparatus, and for starting the driving-means to race the figures or vehicles, means for varying the speed of each of said figures or vehicles, and means for stopping the driving-means at the finish of the race, to cause all of the figures or vehicles to come to rest instantaneously and simultaneously, independently of their individual position.

44. The combination with a plurality of traveling figures or vehicles, of driving-means for driving the figures or vehicles, means for starting the driving means, to bring the figures or vehicles from a position of rest up to a starting point, and in alinement, means for starting all of the figures or vehicles simultaneously after they have been alined, and causing them to traverse a course, means for imparting an undulating motion to said figures or vehicles, and means for stopping the driving-means when the figures or vehicles have reached a point different from the starting line, after having traversed the course, the construction and arrangement being such that the stoppage of the forward movement of the figures or vehicles causes the undulatory movement of the figures or vehicles to cease.

45. In apparatus of the character described, the combination with a plurality of companion tracks or ways provided with a finish-line of a plurality of independently driven devices moving over said tracks or ways, a stop-device for each driven device, of a magnet for controlling said stop-device, and a finish-line circuit breaker governing the action of said magnet.

46. In apparatus of the class described, the combination of a plurality of tracks or ways provided with automatic means to indicate a starting line, and automatic means to indicate a finish line; devices independently movable in said tracks or ways, means for causing said figures or vehicles to traverse said tracks or ways, and means whereby said figures or vehicles have a vibratory motion simultaneously with their forward movement.

47. In apparatus of the character described, the combination with a plurality of independently driven figures or vehicles, of means for driving said figures or vehicles, and a track or way provided with a starting line, a finish line, and a series of undulations whereby the figures or vehicles are given a vibratory motion while being driven forward.

48. In apparatus of the class described, the combination with two or more companion tracks or ways, provided with automatic means to indicate a starting line, and automatic means to indicate a finish line; of a plurality of motor driven figures movable in said tracks or ways, an energy generator for the driving motor or motors, and a contact device for connecting the motor or motors to said generator.

Signed at New York in the county of New York and State of New York this 11th day of September A. D. 1899

GRANVILLE T. WOODS.

Witnesses:
M. J. LUDLOW,
D H DECKER.